United States Patent [19]
Gossard et al.

[11] Patent Number: 5,166,100
[45] Date of Patent: Nov. 24, 1992

[54] METHODS OF MAKING NANOMETER PERIOD OPTICAL GRATINGS

[76] Inventors: Arthur C. Gossard, 4250 Via Esperanza, Santa Barbara, Calif. 93110; Paul K. Hansma, 6891 Trigo Rd., Goleta, Calif. 93117; Scott A. Chalmers, 7592 Hempstead Ave., Goleta, Calif. 93117; Albrecht L. Weisenhorn, 134 Verona Ave., Goleta, Calif. 93117

[21] Appl. No.: 622,909

[22] Filed: Dec. 6, 1990

[51] Int. Cl.$^5$ .......................................... H01L 21/465
[52] U.S. Cl. .................................... 437/228; 437/245; 437/128
[58] Field of Search ............. 148/DIG. 160; 437/228, 437/245

[56] References Cited

U.S. PATENT DOCUMENTS 4,591,889  5/1986  Gossard et al. .................... 357/22 R
4,843,032  6/1989  Tokuda et al. ........................ 357/17

OTHER PUBLICATIONS

Yamamoto, T., et al., "OMVPE Buried Ultrafine Periodic Structures in GaInAs and InP", *Microelectronic Engineering*, Apr. 1990, vol. 11, No. 1-4, pp. 93-96.

*Primary Examiner*—Olik Chaudhuri
*Assistant Examiner*—G. Fourson

[57] ABSTRACT

An ultragrating is a nanometer-period optical grating that is fabricated from a horizontal superlattice. A superlattice is a material structure grown on a substrate by molecular-beam epitaxy or metal-organic chemical vapor deposition and having periodic compositional variations. A horizontal superlattice is one in which the compositional variations are in a direction parallel to the substrate surface. By the selective removal of one of the superlattice materials, an ultragrating is obtained. The smallest grating periods possible before this discovery were those made by electron-beam lithographic techniques which are limited to values greater than 100 nanometers. Thus, the ultragrating with grating periods ranging from one to a hundred nanometers represents an order of magnitude advancement in the state of the art of making optical gratings. The ultragrating will fine utility in the design of advanced electronic devices and for general scientific and engineering purposes.

9 Claims, 2 Drawing Sheets

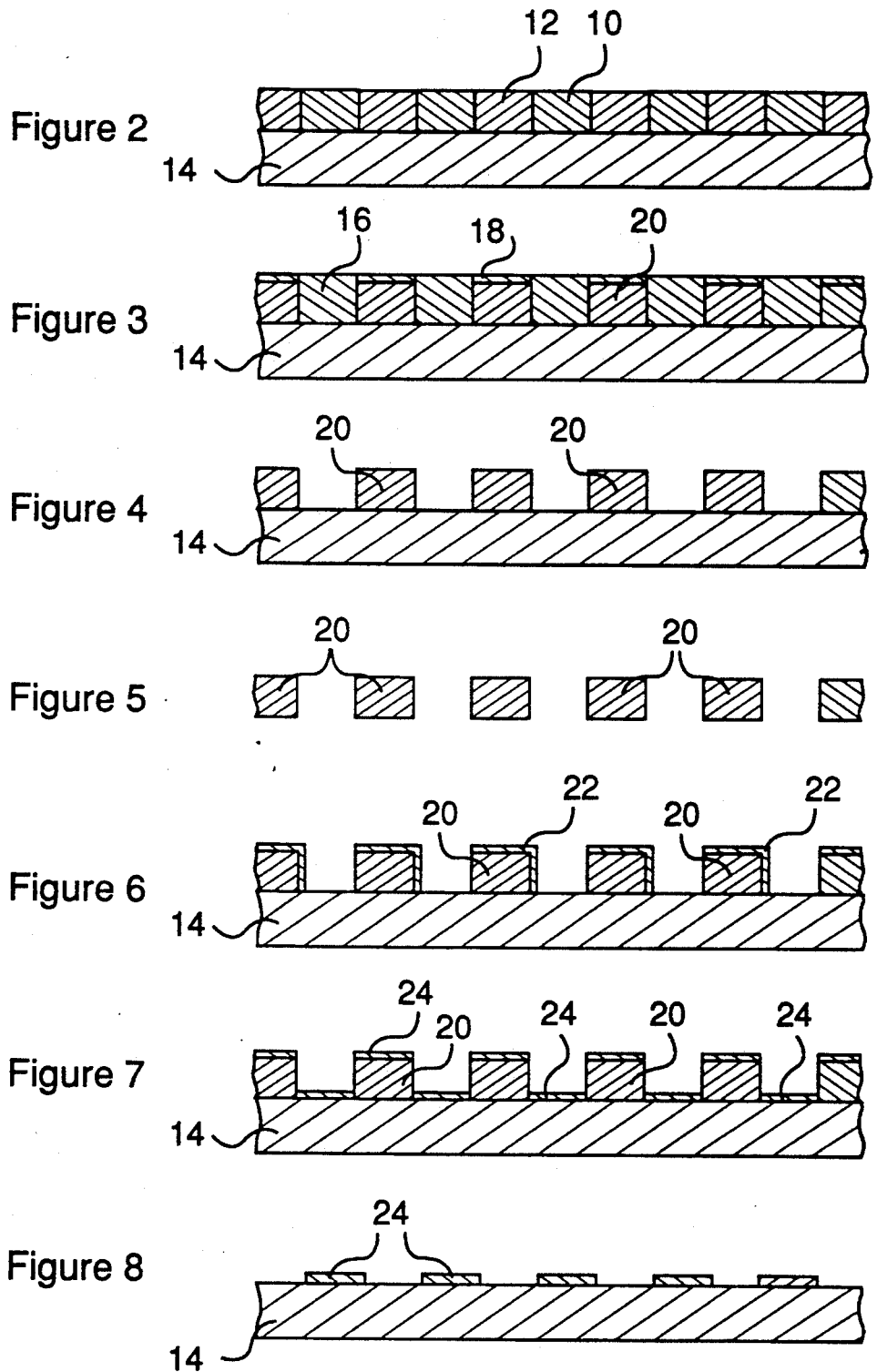

METHODS OF MAKING NANOMETER PERIOD OPTICAL GRATINGS

BACKGROUND OF THE INVENTION

This invention relates to nanometer-period optical gratings and superlattices from which such optical gratings can be fabricated.

Superlattices are epitaxially-grown material structures having atomic-scale periodic compositional variations. The more familiar superlattices are fabricated from one or more semiconductors which are grown in alternate layers, one or more atoms thick, on a major surface of a suitable substrate. A typical superlattice is exemplified by alternate layers of AlGaAs and GaAs grown on a major crystallographic plane of GaAs. Such conventional superlattices may be termed "vertical" superlattices in that the periodicity in composition is in the direction perpendicular to the substrate surface.

More recently, "horizontal" superlattices in which the compositional periodicity is in a direction substantially parallel to the substrate surface have been developed. Horizontal superlattices together with the method of fabrication is fully described in U.S. Pat. No. 4,591,889 issued on May 27, 1986 which is incorporated by reference.

The availability of horizontal superlattices provides the basis for fabricating ridged surfaces with periods an order of magnitude smaller than has heretofore been possible. Such gratings will be termed "ultragratings" in the material that follows.

SUMMARY OF THE INVENTION

The ultragrating comprises a plurality of elongated members, equally-spaced and lying in a plane, wherein the spacing and dimensions of the members range from about one to about a hundred nanometers. Such gratings are fabricated from horizontal superlattices grown on substrate surfaces having periodic step edges formed by slightly misorienting the surface of a crystalline material with respect to a major crystallographic plane, thereby resulting in horizontal periodicity extending in the direction parallel to the growing surface and normal to the periodic step edges.

By the selective removal of one of the superlattice materials, an ultragrating having nanometer periodicity is formed on the preexisting substrate. By the deposition of metal on the ultragrating thus formed, a metal ultragrating is obtained. A "see-through" ultragrating is obtained by selectively etching away the substrate leaving only a support structure for the ultragrating.

Such gratings will be useful as diffraction gratings for soft x-rays, as molecular filters, as devices to facilitate interaction between electromagnetic waves and plasma waves in metals and acoustic waves in piezoelectric materials, as masks for photolithography and material deposition, as forming mandrels for ultragrating replication, as alignment and ordering means for large molecules, and as a calibration standard for use in determining the shapes of tips used in atomic force microscopes and scanning tunneling microscopes.

BRIEF DESCRIPTION OF THE DRAWINGS

FIG. 2 is a sectional view of the horizontal superlattice and substrate of FIG. 1 taken along the plane indicated in FIG. 1.

FIG. 3 is a sectional view of the superlattice and substrate of FIG. 2 after oxidation.

FIG. 4 is a sectional view of the ultragrating on top of the substrate that results from the removal of the oxides shown in FIG. 3.

FIG. 5 is a sectional view of the ultragrating after the substrate of FIG. 4 is removed.

FIG. 6 is a sectional view of the ultragrating and substrate of FIG. 4 after the angle deposition of metal.

FIG. 7 is a sectional view of the ultragrating and substrate of FIG. 4 after the deposition of metal at normal incidence.

FIG. 8 is a sectional view of the metal ultragrating that results from the removal of the ridges of the ultragrating shown in FIG. 7.

The vertical dimensions in the various figures are not necessarily to scale.

DESCRIPTION OF THE PREFERRED EMBODIMENT

The process of making GaAs ultragratings is illustrated in FIGS. 1 through 4. An AlAs/GaAs horizontal superlattice is first grown on a GaAs substrate that has been cut vicinally and coated with one or more smoothing epitaxial buffer layers so as to have equally-spaced surface steps with heights equal to the interatomic spacing and with widths equal to the desired ultragrating period.

The term "substrate" is used herein to mean an ordinary substrate that might be obtained from a commercial supplier such as Bertram Laboratories located in Bridgewater, New Jersey and Sumitomo Electric Industries, Semiconductor Department, Electric Materials Division located in Hyogo, Japan, an ordinary substrate upon which a homoepitaxial layer or smoothing epitaxial buffer layers have been grown, or an ordinary substrate however processed to provide a suitable surface for growing a horizontal superlattice.

The superlattice growth is accomplished by an appropriate epitaxial growth technique such as molecular-beam epitaxy or metal-organic chemical vapor deposition. The process is fully described in U.S. Pat. No. 4,591,889 as mentioned earlier.

Figure 1:
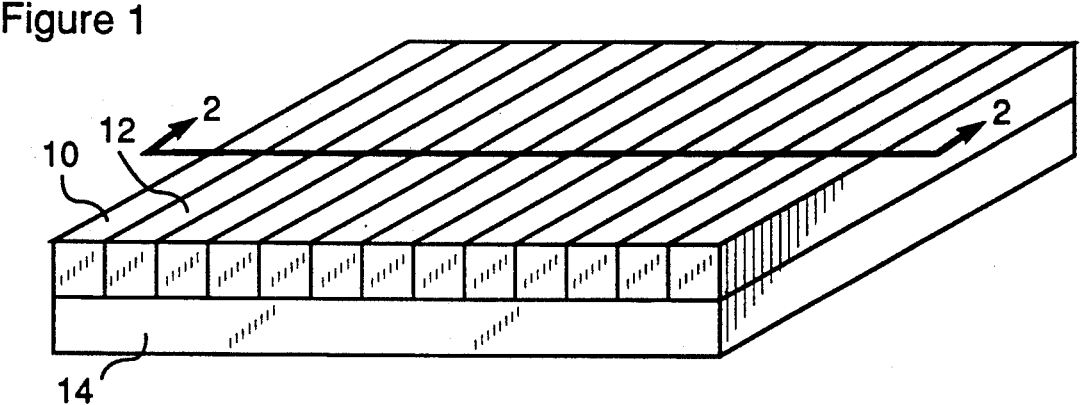
FIG. 1 is a perspective view of a horizontal superlattice grown on top of a substrate.

The resulting structure consists of interleaved sets of parallelopipeds as shown in FIG. 1, one set 10 consisting of high-Al-content AlGaAs and the other set 12 consisting of low-Al-content AlGaAs, supported by the GaAs substrate 14. A sectional view of this structure taken along the plane indicated in FIG. 1 is shown in FIG. 2.

The next step in the process is to oxidize the superlattice of FIGS. 1 and 2 by exposure to air for a time long enough to oxidize substantially all of the high-Al-content regions. Approximately a month is required when the thickness of the AlGaAs is 20 nanometers. The result of this step is shown in FIG. 3. The oxidation of the high-Al-content regions is essentially complete thus converting these regions to oxide 16 while a thin oxide 18 is formed on the exposed surfaces of the low-Al-content regions 20.

The oxides are next removed with an HCl solution leaving low-Al-content AlGaAs grating ridges 20 supported by the GaAs substrate 14 as shown in FIG. 4.

There exist other methods for the selective removal of portions of the superlattice which will also result in a ridged surface. For example, the oxidation of the structure may be carried out in water, ozone, dry oxygen, or other oxygen-containing environment. The oxide can be removed by many acidic solutions other than HCl. Also, the oxidize/etch steps may be replaced by a single etch step which is selective to GaAs or AlAs such as HF.

For those applications where only the ultragrating (without the substrate) is required, another processing step is performed. The substrate, except for a support structure for the ultragrating, is selectively etched away leaving the ultragrating as shown in FIG. 4 (support structure not shown).

The substrate-supported ultragrating of FIG. 4 can be used in a number of different ways. If the dimensions of the ultragrating are tailored to match the size of particular molecules, such molecules deposited on the ultragrating would be preferentially absorbed in the grooves and the molecules would then present an ordered, aligned array for convenience in analysis, for the enhancement of chemical reactivity of the molecules, for use in the formation of catalytic structures, and in the case of DNA, for convenience in sequencing.

An ultragrating fabricated on a piezoelectric substrate can be used as a means of coupling incident electromagnetic waves of appropriate frequency to surface acoustic waves within the piezoelectric substrate. The ultragrating ridges will concentrate the electric field of the incident electromagnetic wave in the region between the ridges thereby causing the piezoelectric material to alternately expand and contract in time preferentially in the regions beneath the grooves. This effect can be used to launch or detect surface acoustic waves traveling in a direction perpendicular to the ridges and is potentially useful for delay lines, memories, and phonon lasers.

The ultragrating of FIG. 4 can also be used as a "comb" or "brush" for aligning fibers or molecules by moving the ultragrating across a surface in the direction of the ridges. It can also serve as a tool for characterizing the tips of scanning probe microscopes (such as atomic force microscopes or scanning tunneling microscopes). As the tip is scanned across the grating in the direction perpendicular to the grooves, the shape of the tip can be determined from measurements of vertical displacement as a function of horizontal position.

Other uses of the ultragrating become feasible when the GaAs substrate 14 of FIG. 4 is selectively etched away in a plurality of regions thereby leaving a structure of support members surrounding open regions beneath the ultragrating. In essence, an unblocked ultragrating as shown in FIG. 5 is thereby obtained.

Unblocked ultragratings of the type described can be used as masks for photolithography and material deposition. They also can be used as filters for filtering large molecules from liquid solutions and as forming mandrels for replicating the ultragrating structure in other materials. The forming process is accomplished simply by pressing the ultragrating into the other material.

Metal ultragratings can be fabricated in a number of ways. One way is to make an angle deposition of metal on the ultragrating of FIG. 4 with the result shown in FIG. 6. Because the ridges 20 shadow the substrate surfaces between the ridges, the deposited metal 22 covers only the top and one side of the ridges.

Another way of fabricating a metal ultragrating is to make the metal deposition in a direction perpendicular to the ultragrating with the result shown in FIG. 7. Metal 24 covers both the tops of the ridges 20 and the substrate 14 between the ridges. By the selective etching away of the ridges 20, the structure of FIG. 8 is obtained. The metal 24 that was deposited on the substrate remains forming a metal ultragrating on a GaAs substrate 14.

Metal ultragratings are useful as diffraction gratings for soft x-rays having wavelengths comparable to the ultragrating period. An ultragrating used as a diffraction grating permits the selection of particular wavelength x-rays from a broad band spectrum of x-rays.

Metal ultragratings can also provide the means for coupling electromagnetic radiation to an electron plasma in which electron motion is perpendicular to the substrate surface when the electricfield polarization is also perpendicular to the surface.

Figure 9:
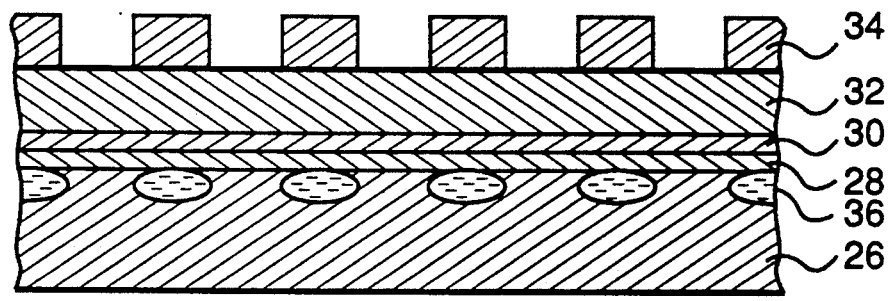
FIG. 9 is a sectional view of an ultragrating grown above an electron channel and thereby forming quantum wires of electrons.

Still more uses of the ultragrating become possible if the ultragrating is fabricated on top of more sophisticated substrate structures such as that shown in FIG. 9. The substrate structure illustrated consists, by way of example, of a GaAs substrate 26, an AlGaAs barrier layer 28, an AlGaAs layer 30 with n-type doping, another AlGaAs barrier layer 32, and finally an AlGaAs ultragrating 34. Electrons in the conducting channel 26 are depleted from regions between the ridges 34 of the ultragrating thereby forming "quantum wires" of electrons 36. The electron density and motion can be controlled by means of a gate electrode which is typically a metal layer deposited on top of the ultragrating. Such ultragrating structures would have application in the design of transistors.

Figure 10:
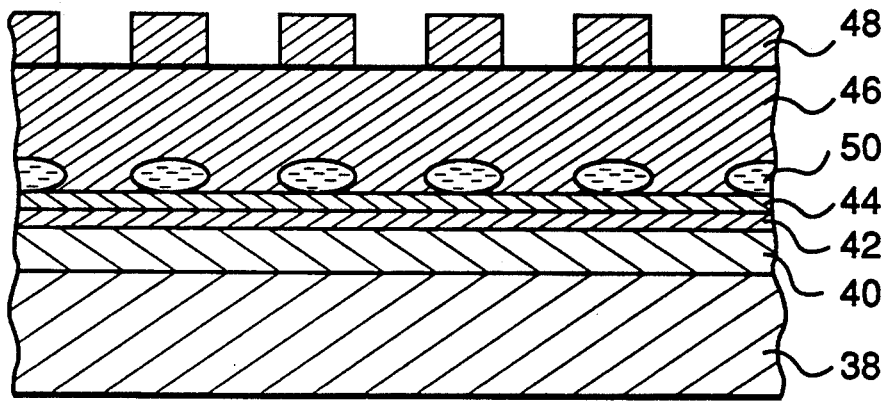
FIG. 10 is a sectional view of an alternative structure to that shown in FIG. 9 whereby quantum wires of electrons are formed in an upper conducting layer.

An alternative structure directed toward the same applications is shown in FIG. 10. It consists of a GaAs substrate 38, an AlGaAs barrier layer 40, an AlGaAs layer 42 with n-type doping, another AlGaAs barrier layer 44, a GaAs layer 46, and finally a GaAs ultragrating 48. In this structure, the upper conducting GaAs layer 46 is nearer to the electron-supplying doped AlGaAs layer 42 and consequently the "quantum wires" of electrons 50 are formed in the upper layer 46.

What is claimed is:

1. The process of making an ultragrating having a period greater than about one and less than about one hundred nanometers comprising the following steps:
   growing a horizontal superlattice on a substrate; and
   removing at least one of the superlattice materials thereby leaving the ultragrating made of the remaining superlattice materials, the ultragrating being supported by the substrate.

2. The process of claim 1 comprising the following additional step:
   depositing metal on the ultragrating thereby obtaining a second ultragrating having a composite material structure consisting of the metal superimposed on the original ultragrating materials.

3. The process of claim 1 comprising the following additional steps in the sequence set forth:
   depositing metal on the ultragrating and the exposed regions of the substrate; and removing the original ultragrating thereby obtaining a second ultragrating made of the metal deposited on the exposed regions of the substrate.

4. The process of claim 1 comprising the following additional step:

removing a plurality of regions of the substrate thereby leaving the ultragrating supported by a plurality of interconnected structural members.

5. The process of claim 1 wherein the removing of at least one of the superlattice materials is accomplished by the following steps:

oxidizing the materials to be removed; and selectively etching away the oxidized materials.

6. The process of claim 5 wherein the superlattice materials are low-Al-content AlGaAs and high-Al-content AlGaAs, the high-Al-content AlGaAs being sufficiently high in aluminum content to be oxidizable and the low-Al-content AlGaAs not being significantly high in aluminum content to be oxidizable.

7. The process of claim 6 wherein the etching substance is HCl.

8. The process of claim 1 wherein the removing of at least one of the superlattice materials is accomplished by the following step:

etching the superlattice with an etching medium that selectively dissolves at least one of the superlattice materials.

9. The process of claim 1 wherein the removing of at least one of the superlattice materials is accomplished by the following step:

etching the superlattice in HF.

* * * * *